(12) United States Patent
Durkot et al.

(10) Patent No.: US 6,284,410 B1
(45) Date of Patent: *Sep. 4, 2001

(54) ZINC ELECTRODE PARTICLE FORM

(75) Inventors: Richard Edward Durkot, East Walpole; Lifun Lin, Lincoln; Peter Bayard Harris, Stow, all of MA (US)

(73) Assignee: Duracell Inc., Bethel, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 08/905,254

(22) Filed: Aug. 1, 1997

(51) Int. Cl.$^7$ ............................................ H01M 4/42

(52) U.S. Cl. ..................... 429/229; 429/134; 429/300

(58) Field of Search ...................................... 429/134, 300, 429/229

(56) References Cited

U.S. PATENT DOCUMENTS

| | | |
|---|---|---|
| 3,954,506 | 5/1976 | Sullivan . |
| 4,372,823 * | 2/1983 | Church et al. ................... 204/2.1 |
| 4,487,651 | 12/1984 | Wang . |
| 4,548,642 | 10/1985 | Glaeser . |
| 4,606,869 | 8/1986 | Showak . |
| 4,619,845 | 10/1986 | Ayers et al. . |
| 4,631,013 | 12/1986 | Miller . |
| 4,778,516 | 10/1988 | Raman . |
| 4,920,020 | 4/1990 | Strauven et al. . |
| 5,082,622 | 1/1992 | Meeus et al. . |
| 5,168,018 * | 12/1992 | Yoshizawa et al. ................ 429/190 |
| 5,183,481 | 2/1993 | Felder . |
| 6,015,636 | 1/2000 | Goldstein et al. . |
| 6,022,639 | 2/2000 | Urry . |

FOREIGN PATENT DOCUMENTS

| | | |
|---|---|---|
| 2077796 | 9/1992 | (CA) . |
| 23 45 514 A1 | 9/1973 | (DE) . |
| 2347273 | 3/1974 | (DE) . |
| 2441356 | 3/1975 | (DE) . |
| 2364203 | 6/1975 | (DE) . |
| 3605718 A | 8/1987 | (DE) . |
| 0 328 131 A2 | 8/1989 | (EP) . |
| 0 497 074 A1 | 1/1991 | (EP) . |
| 0 762 521 A2 | 12/1997 | (EP) . |
| 0 817 294 A1 | 7/1998 | (EP) . |
| 2 276 699 | 6/1974 | (FR) . |
| 51 104533 | 9/1976 | (JP) . |
| 53-41741 A | 4/1978 | (JP) . |
| 53-89811 A | 8/1978 | (JP) . |
| 54-99945 A | 1/1979 | (JP) . |
| 55-66865 A | 5/1980 | (JP) . |
| 56-82571 A | 7/1981 | (JP) . |
| 57-82972 A | 5/1982 | (JP) . |
| 57-182972 | 11/1982 | (JP) . |
| 57182972 | 2/1983 | (JP) . |
| 58-026455 | 2/1983 | (JP) . |
| 83-32744 B | 7/1983 | (JP) . |
| 59-66061 | 4/1984 | (JP) . |
| 59-94371 | 5/1984 | (JP) . |
| 59.121780 | 7/1984 | (JP) . |
| 60.114548 | 6/1985 | (JP) . |
| 60.146454 | 8/1985 | (JP) . |
| 60.146455 | 8/1985 | (JP) . |
| 60.146456 | 8/1985 | (JP) . |
| 60.146457 | 8/1985 | (JP) . |
| 60.32249 | 8/1985 | (JP) . |
| 60.175364 | 9/1985 | (JP) . |
| 60.175368 | 9/1985 | (JP) . |
| 60.236462 | 11/1985 | (JP) . |

(List continued on next page.)

OTHER PUBLICATIONS

NJZ Metal Powder Data Sheet, Horse Head Zinc Powders, The New Jersey Zinc Company, Inc., Pre–1996.

Huot et al., "Electrochemical Performance of Gelled Zinc Alloy Powders in Alkaline Solutions", pp. 81–85, Journal of Power Sources, vol. 65, Nos. 1–2, Mar.–Apr. 1997.

Ozbilen et al., "Influence of Liquid Metal Properties on Particle Size of Inert Gas Atomised Powders", pp. 44–52, Power Metallurgy, vol. 39, No. 1, 1996.

Hani Henein, "Process Diagnostics to Monitor and control Gas Atomization Operations", pp. 1–199–1–219, Metal Powder Industries Foundation, 1996.

Boyko et al., "Ensemble Laser Probe Sizing Results for Gas Atomized Zinc Powders", pp. 655–658, First International Conference on Processing Materials for Properties, 1993.

Ali Unal, "Gas Atomization of Fine Zinc Powders", pp. 11–21, The International Journal of Powder Metallurgy, vol. 26, No. 1, 1990.

Dunkley et al., "Evaluating the Performance of Atomizers for Producing Metal Powders", pp. 26–31, Industrial Heating, Oct. 1989.

Lavernia et al., "Powder Size and Distribution in Ultrasonic Gas Atomization", pp. 22–26, Journal of Metals, Aug. 1985.

"Gas Atomisation of High Temperature Alloy Powders", pp. 563–566, MPR, Oct. 1983.

J.J. Dunkley, "Properties and Applications of Atomised Metal Powders", pp. 520–525, Assoc. Italiana di Metallurgia, 1982.

Commercial Battery Date Unknown.
Commercial Battery Date Unknown.
Commercial Battery Date Unknown.

*Primary Examiner*—Gabrielle Brouillette
*Assistant Examiner*—Monique Wills
(74) *Attorney, Agent, or Firm*—Fish & Richardson P.C.

(57) ABSTRACT

A primary electrochemical cell with an anode comprising zinc alloy particles suspended in a fluid medium is disclosed. The zinc alloy particles include at least about 10 percent, by weight, of fines (particles of −200 mesh size) or dust (particles of −325 mesh size). The zinc particles are preferably alloyed with indium or bismuth and of acicular or flake form. The anode has a low resistivity at low zinc loadings, and the cell demonstrates good mechanical stability and overall performance.

27 Claims, 5 Drawing Sheets

FOREIGN PATENT DOCUMENTS

| | | |
|---|---|---|
| 60.262352 | 12/1985 | (JP) . |
| 60.262353 | 12/1985 | (JP) . |
| 60.262354 | 12/1985 | (JP) . |
| 61.10861 | 1/1986 | (JP) . |
| 61.19066 | 1/1986 | (JP) . |
| 61-49373 | 3/1986 | (JP) . |
| 61.58164 | 3/1986 | (JP) . |
| 61-77264 | 4/1986 | (JP) . |
| 61.78067 | 4/1986 | (JP) . |
| 61.79789 | 4/1986 | (JP) . |
| 61 133560 | 6/1986 | (JP) . |
| 61-133560 | 6/1986 | (JP) . |
| 61.131363 | 6/1986 | (JP) . |
| 61.133560 | 6/1986 | (JP) . |
| 61.140066 | 6/1986 | (JP) . |
| 61.140067 | 6/1986 | (JP) . |
| 61.140068 | 6/1986 | (JP) . |
| 61.140464 | 6/1986 | (JP) . |
| 61.143939 | 7/1986 | (JP) . |
| 61.153948 | 7/1986 | (JP) . |
| 61.153963 | 7/1986 | (JP) . |
| 61.193362 | 8/1986 | (JP) . |
| 62-040162 | 2/1987 | (JP) . |
| 62-31951 | 2/1987 | (JP) . |
| 62-105365 A | 5/1987 | (JP) . |
| 62-123658 | 6/1987 | (JP) . |
| 62-225164 | 10/1987 | (JP) . |
| 63-006747 | 1/1988 | (JP) . |
| 63-195975 | 8/1988 | (JP) . |
| 3-33014 | 2/1991 | (JP) . |
| 30 071559 | 3/1991 | (JP) . |
| 92-08897 B | 2/1992 | (JP) . |
| 09-235636 | 9/1997 | (JP) . |
| 498667 | 1/1974 | (SU) . |
| 399942 | 2/1974 | (SU) . |
| 586516 | 12/1977 | (SU) . |
| 641554 A | 1/1979 | (SU) . |
| WO 91/13924 | 11/1998 | (WO) . |

* cited by examiner

ZINC ELECTRODE PARTICLE FORM

BACKGROUND OF THE INVENTION

The present invention relates to improvements in electrochemical cells, particularly cells having negative electrodes comprising zinc (Zn) particles, such as in alkaline batteries.

An electrochemical cell (i.e., a galvanic cell or battery) has the following basic components: a negative electrode (sometimes called an anode), a positive electrode (sometimes called a cathode), and an ion-conductive solution (sometimes called an electrolyte) providing a path for the transfer of charged ions between the two electrodes when they are connected through an external load.

Some alkaline cells have anodes with zinc as an active element, and cathodes with manganese dioxide ($MnO_2$) as an active element. Anodes do not have to be solid; in fact, conventional alkaline cells have a gelled zinc anode mixture. The mixture contains individual zinc metal particles suspended in a thickened liquid or gel containing a gelling agent, an alkaline electrolyte such as potassium hydroxide (KOH), and minor amounts of other additives, such as indium or bismuth (gassing inhibitors for reducing the undesirable tendency for hydrogen gas to build up inside the cell). The zinc particles are characterized by a specific size range, commonly indicated by the standard mesh size through which the particles pass. Typically, average anode particle sizes fall in the range of about −50/+200 mesh, indicating particles that pass through a 50 mesh screen and do not pass through a 200 mesh screen (the larger the screen number, the smaller the aperture size of the screen).

Common gelling agents used in anodes include carboxymethycellulose, polyacrylic acid (e.g., Carbopol 940™ from B.F. Goodrich in Brecksville, Ohio, or POLYGEL-4P™ from 3V in Bergamo, Italy), sodium polyacrylate (e.g., CL-15™ from Allied Colloids in Yorkshire, England), and salts. Non-limiting examples of gassing inhibitors include inorganic additives such as indium, bismuth, tin and lead and organic inhibitors such as phosphate esters and anionic and non-ionic surfactants. See U.S. Pat. Nos. 5,283,139, 5,168,018, 4,939,048, 4,500,614, 3,963,520, 4,963,447, 4,455,358, and 4,195,120 for examples of various anode mixtures.

The gel anode is typically separated from the cathode by a separator, such as a thin layer of non-woven material or paper, that prohibits electronic conduction between the anode and the cathode but allows ions to pass between them.

Alkaline $Zn/MnO_2$ cells have been commercially available for over 30 years, during which time their performance characteristics have been incrementally optimized by the industry in an attempt to provide the "longest lasting" battery (i.e., one with the greatest overall capacity, measured in ampere-hours) within the volume constraints imposed by the international size standards (e.g., AAA, AA, C, D cylindrical and 9 volt prismatic sizes). The volume within such standard cells, into which the active materials are packed, is more or less fixed. The amount of energy available from any given cell size (which is a function of the total amount of the active elements in the cell) has a theoretical upper limit which is defined by the internal cell volume and the practical densities of the active components that are employed.

In addition to trying to produce the "longest-lasting" battery, battery manufacturers are also trying to increase the maximum instantaneous rate of electrical current that can be generated from a battery under a given load without the battery voltage dropping below a minimum value. The motivation for increasing this "maximum discharge rate" capability includes the ongoing development of electronic products, such as cellular phones, which require high currents from small packages. Some of these new devices automatically test the voltage levels of their batteries, and therefore may cause the premature disposal of batteries which have remaining overall capacity, if the sensed voltage dips excessively during a period of high current draw.

When a high current is being drawn from a battery, the voltage of the battery may drop due to zinc particle surface "passivation" or anode polarization which can indicate a localized lack of sufficient hydroxide ions to sustain the chemical reaction of the cell. It is believed that a certain amount of porosity is necessary for the free supply of $OH^-$ ions coming from the electrolyte and the free disposal of $Zn(OH)_4^-$, $Zn(OH)_2$ or ZnO reaction products back into the electrolyte. If the zinc particles are too densely crowded, or if their surfaces are inaccessible due to accumulation of reaction products, the reaction cannot keep up with the rate of current draw. Batteries with densely packed zinc in their anodes may perform acceptably with very stable voltage levels while supplying low continuous currents, but drop to very low, unacceptable voltages when a high current is drawn due to zinc crowding (sometimes referred to as "choking" or being "electrolyte starved").

In addition, too little electrolyte can starve the overall chemical reaction of the cell or cause the battery to "dry out", as water from the electrolyte is continuously consumed during discharge. The net reaction inside the cell is:

$$Zn + 2MnO_2 + H_2O \rightarrow ZnO + 2MnOOH.$$

Thus, competing with the desire to pack as much zinc as possible into the available anode volume to increase overall capacity for "long life" is the need to provide a sufficient amount of electrolyte to avoid "choking" during periods of high discharge rate.

SUMMARY OF THE INVENTION

The invention is based upon the discovery that a high proportion of very small zinc particles (i.e., fines or dust) among the zinc particles of the anode of a $Zn/MnO_2$ electrochemical cell can provide good cell performance characteristics, especially those characteristics related to high discharge rate performance.

As used herein, "fines" are particles small enough to pass through a standard 200 mesh screen in a normal sieving operation (i.e., with the sieve shaken by hand). "Dust" consists of particles small enough to pass through a standard 325 mesh screen in a normal sieving operation.

According to one aspect of the invention, a negative electrode for an electrochemical cell contains zinc alloy particles suspended in a fluid medium, with at least about 10 percent, by weight, of the zinc alloy particles being of −200 mesh size or smaller. Even higher percentages (e.g., 25 percent, 50 percent and even 80 percent or more) of zinc fines are preferable.

In some embodiments, the zinc alloy particles also include at least about 25 percent (preferably at least about 50 percent), by weight, of particles between about 20 and 200 mesh size.

Preferably, a substantial percentage (e.g., 10, 45 or 80 percent or more) of the zinc alloy particles are dust (of −325 mesh size or smaller, as defined above).

The negative electrode may include a surfactant. The fluid medium preferably includes both an electrolyte and a thickening agent.

The zinc alloy particles can include a plating material, such as indium and bismuth.

The zinc alloy particles are preferably either generally acicular in shape (having a length along a major axis at least two times a length along a minor axis) or of flake form (having a thickness of no more than about 20 percent of their maximum linear dimension).

According to another aspect, a negative electrode mixture for an electrochemical cell contains zinc alloy particles suspended in a fluid medium with the zinc alloy particles comprising less than about 55 percent (preferably less than about 45 percent) of the electrode mixture, by weight. The zinc alloy particles include a sufficient proportion of particles of about −200 mesh size or smaller to provide an electrode resistivity of less than about 0.2 ohm-centimeters. Preferably, at least about 10 percent, by weight, of the zinc alloy particles are of −200 mesh size (more preferably, of −325 mesh size) or smaller.

According to another aspect, the invention features a primary electrochemical cell having a cathode, an anode with zinc alloy particles suspended in a fluid medium, at least 10 percent, by weight, of the zinc alloy particles being of −200 mesh size or smaller, and a separator between the cathode and the anode.

The anode of the electrochemical cell may include other features, such as zinc alloy particle sizes, mentioned above.

According to a further aspect, a negative electrode slurry for an electrochemical cell contains zinc alloy particles suspended in a fluid medium including an electrolyte. The slurry has a resistivity of less than about 0.2 ohm-centimeters and the zinc alloy particles comprise less than about 55 percent, by weight, of the slurry.

According to another aspect of the invention, a method of generating an electric current includes accumulating ions on the surface of zinc alloy particles suspended in a fluid medium containing an electrolyte, at least about 10 percent, by weight, of the zinc alloy particles being of −200 mesh size or smaller.

Cells constructed according to the invention have displayed high tolerance for mechanical shock. They have also demonstrated high running voltages at high rate drains, low internal impedances under load, and good overall performance under various pulsed rate discharge loads.

In addition, the high proportion of zinc fines or dust can enable the total amount of zinc to be reduced (i.e., the cell can have a lower zinc "loading") while maintaining overall capacity on practical drains and without the typical loss in mechanical stability normally associated with a reduction in zinc loading. This is believed to be due, in part, to a high efficiency of zinc usage and good particle-to-particle connectivity.

By reducing the total zinc loading needed to achieve a given performance level, water and alkaline electrolyte can be added which may reduce the risk of anode choking.

Other advantages and features will become apparent from the following description and claims.

DESCRIPTION OF THE PREFERRED EMBODIMENTS

Figure 1:
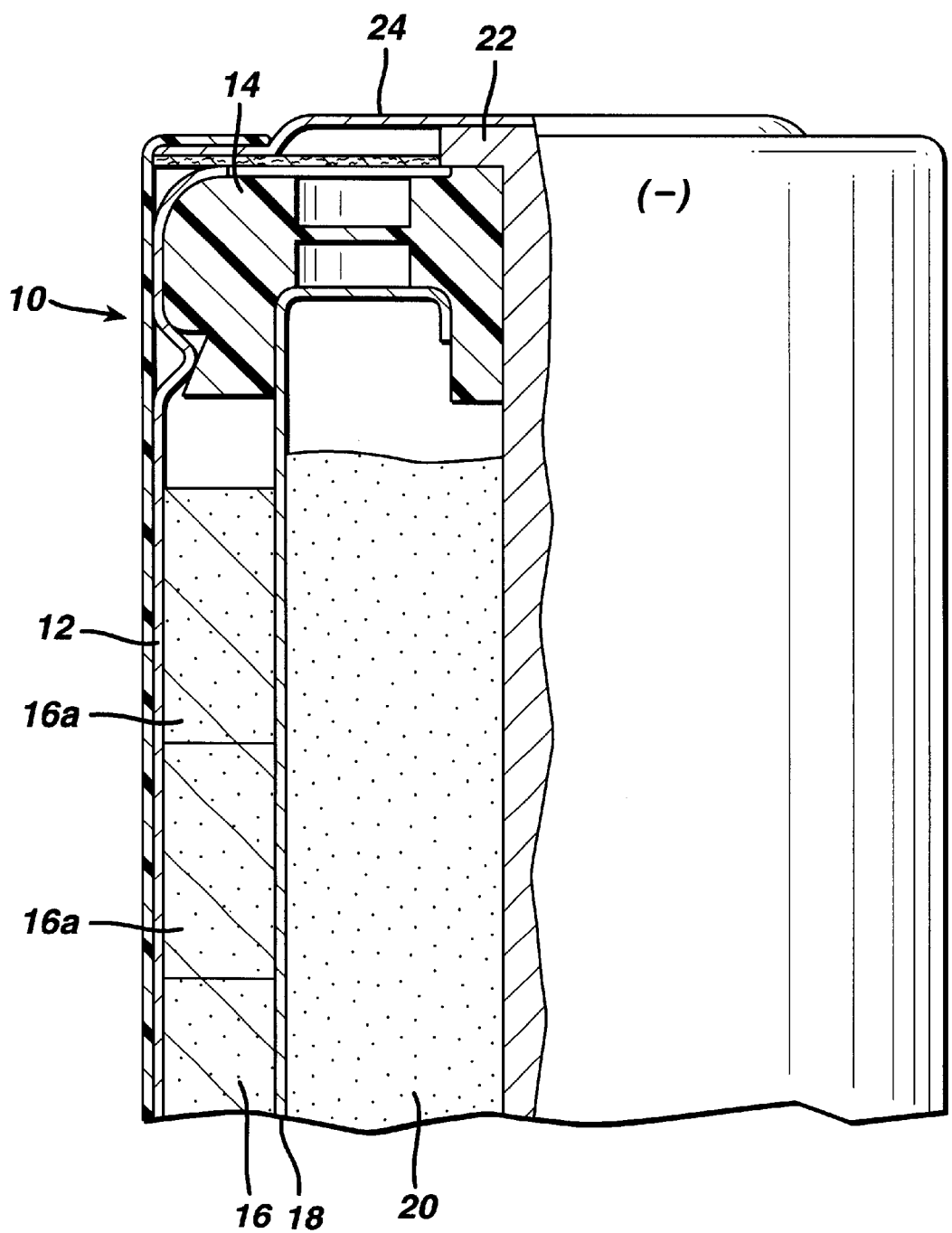
FIG. 1 is a cross sectional view through an alkaline cell.

Referring to FIG. 1, cylindrical cell 10 has a casing 12 closed at its open end by seal member 14 being crimped in place. The cathode 16 is an annular structure with an outer surface in electrical contact with the inner surface of the casing, which serves as the positive external terminal of the cell. Cathode 16 is formed by stacking multiple cathode pellets 16a, as shown. Each cathode pellet is made from a mixture of $MnO_2$, a conductive agent, and electrolyte. Alternatively, the cathode may be formed directly in the casing by pressure compaction, without stacking individual pellets.

A separator 18 lines the inner surfaces of annular cathode 16 and electronically separates the cathode from the anode 20. Separator 18 can be any of a number of well known separator materials, such as cellulose or rayon.

Anode 20 is of gel form, having a desired amount of zinc metal, in particulate form, suspended in a mixture of alkaline electrolyte and a gelling agent. Gassing inhibitors, such as those described above, are preferably added to the anode gel or as a coating on the zinc particles. Generally, the zinc and alkaline electrolyte together make up about 96%, and more preferably about 98%, by weight, of the anode.

Anode collector 22 passes through seal member 14 and extends into anode 20. The upper end of anode collector 22 electrically contacts a negative end cap 24, which serves as the negative external terminal of the cell. Upon assembly, additional liquid alkaline electrolyte is added to the cell and becomes distributed throughout the anode, cathode, and separator.

The zinc particles in the anode include a significant proportion of fines, at least 10% by weight, preferably at least 50% by weight, and more preferably at least 80% by weight. High performance has also been noticed, as described more fully below, when there is a significant proportion of zinc dust in the anode.

The desired distribution of particle sizes can be produced by several processes. For instance, standard mesh sieves can be employed to sort zinc particles produced by centrifugal atomization, gas atomization, or any other known method. Once sorted, by sieving or air classification, for instance, various size ranges of particles can be mixed in proper proportions to produce the desired size distribution. Alternatively, the average size of the particles, as produced, can be controlled, along with the distribution of particle sizes about a mean, to produce a statistical distribution having a significant proportion of fines and dust. Once formed, the particles can be mixed with surfactants, gassing inhibitors, gelling agents, electrolyte and other additives by standard processes.

Figure 2:
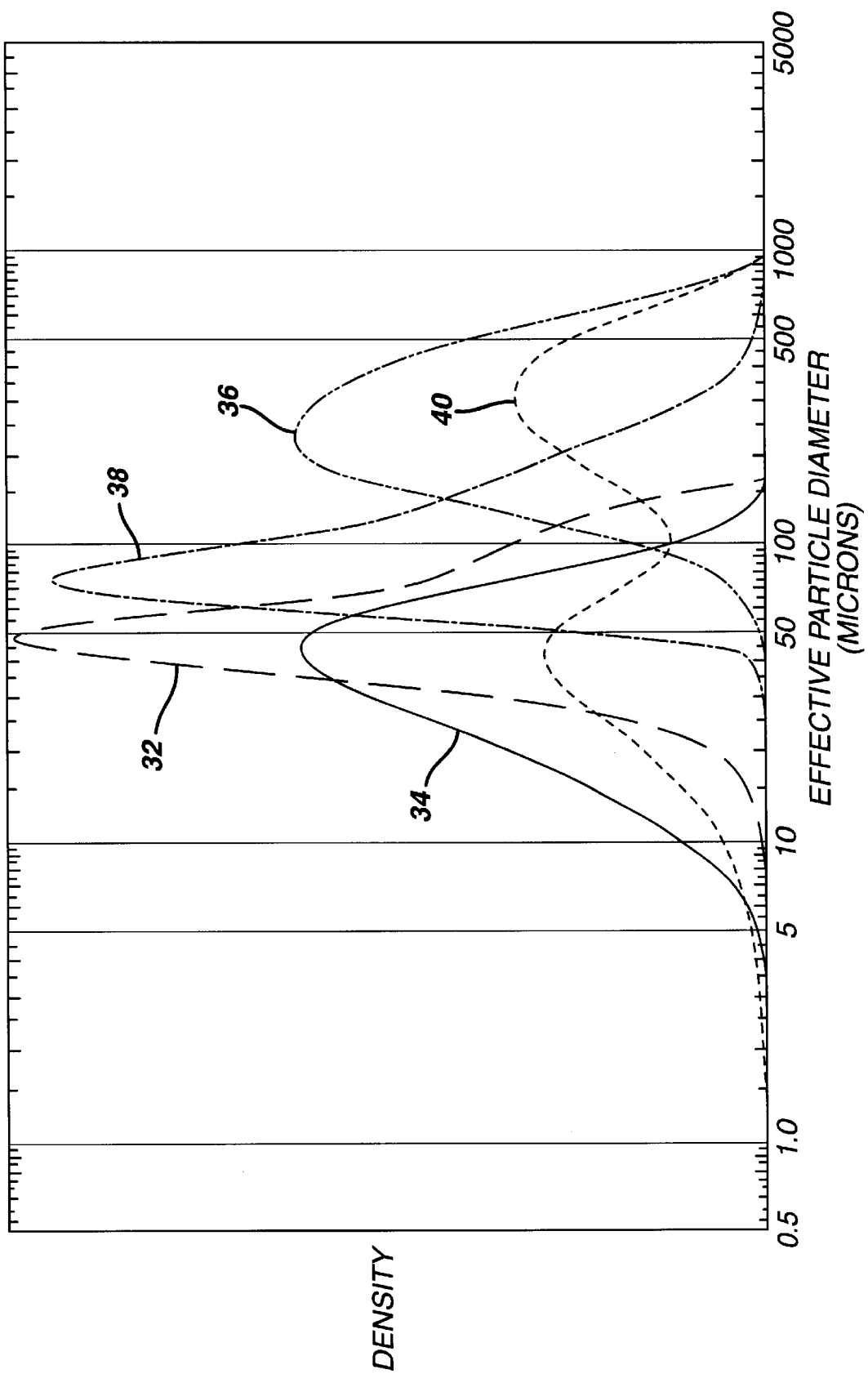
FIG. 2 illustrates zinc particle size distributions.

FIG. 2 illustrates some of the distributions of zinc particles that have been tested in anode 20. The distributions are shown as a function of effective particle diameter as measured with the particle diameter measurement technique described below. As a rough correspondence between mesh sizes and effective particle diameters, it should be noted that spherical particles with a diameter of 74 microns, for instance, will just sift through a 200 mesh screen, and spherical particles with a diameter of 44 microns will just sift through a 325 mesh screen. This correspondence is less accurate for particles of other shapes. Distribution 32 is of centrifugally atomized zinc particles that were sifted through a 325 mesh screen (i.e., zinc dust), and has a peak at an effective particle diameter of about 57 microns. Distribution 34 is of gas atomized particles. Distributions 36 and 38 are of centrifugally atomized particles of −20/+200 and −200 mesh size, respectively. Distribution 40 is a combination of 50%, by weight, of the zinc dust of distribution 34 and 50%, by weight, of the particles of distribution 36.

One of the effects of including significant proportions of very small zinc particles is an increase in the bulk surface area (i.e., the aggregate surface area) of the zinc particles in the anode. This is due to the inherent relationship between particle surface area and volume: namely that, for particles of similar shape, decreasing the particle size increases the surface area to volume ratio of the particle. High bulk surface area for a given particle mass is offered as a possible explanation of some of the high performance demonstrated by batteries with zinc fines.

Figure 3:
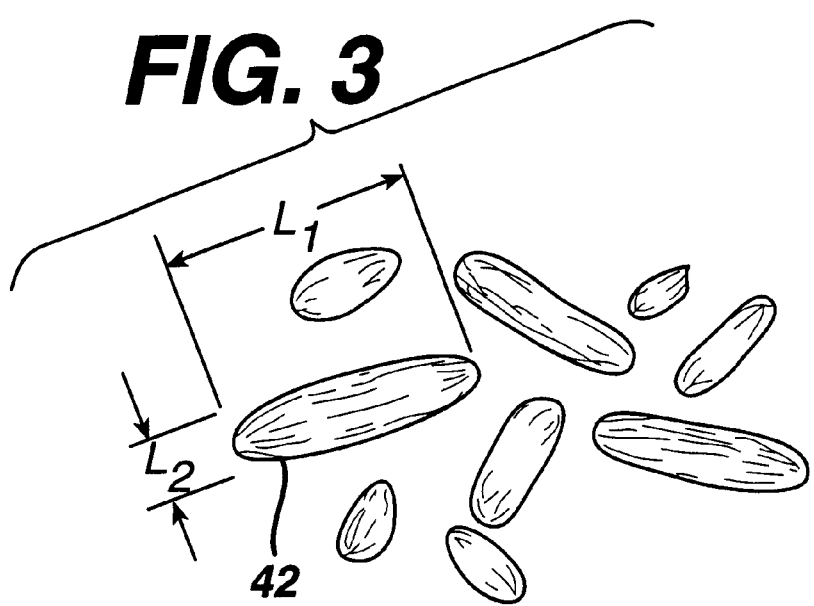
FIG. 3 shows acicular particles.
Figure 4:
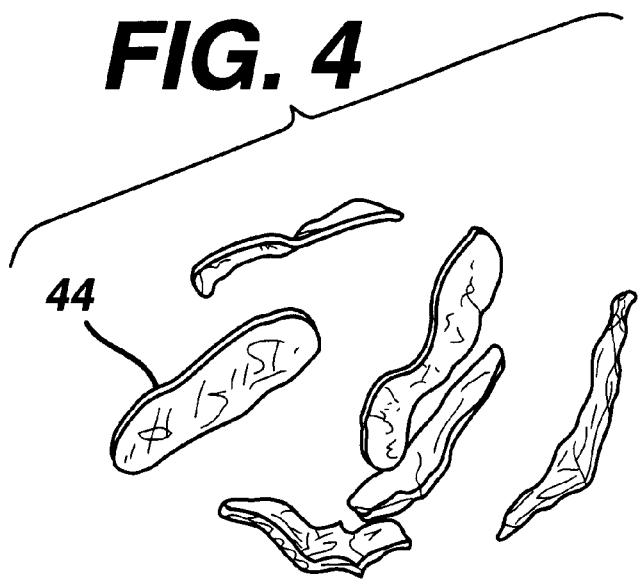
FIG. 4 shows flake particles.

Particle surface area can be further enhanced by controlling the production or subsequent processing of the zinc particles to produce particles with extended, non-spherical shapes, such as flakes or acicular particles. Acicular shapes (see particle 42 in FIG. 3, for instance) having a length $L_1$ along a major axis at least two times a length $L_2$ along a minor axis are considered to be appropriate. Flakes, such as particle 44 in FIG. 4, have a thin cross-section and two broad, opposite sides (such as a wafer or potato chip). Preferably, such a flake-form particle has an average thickness between its broad sides of no more than about 20% of the maximum dimension of the particle, to have a very low volume to surface area ratio.

Figure 5:
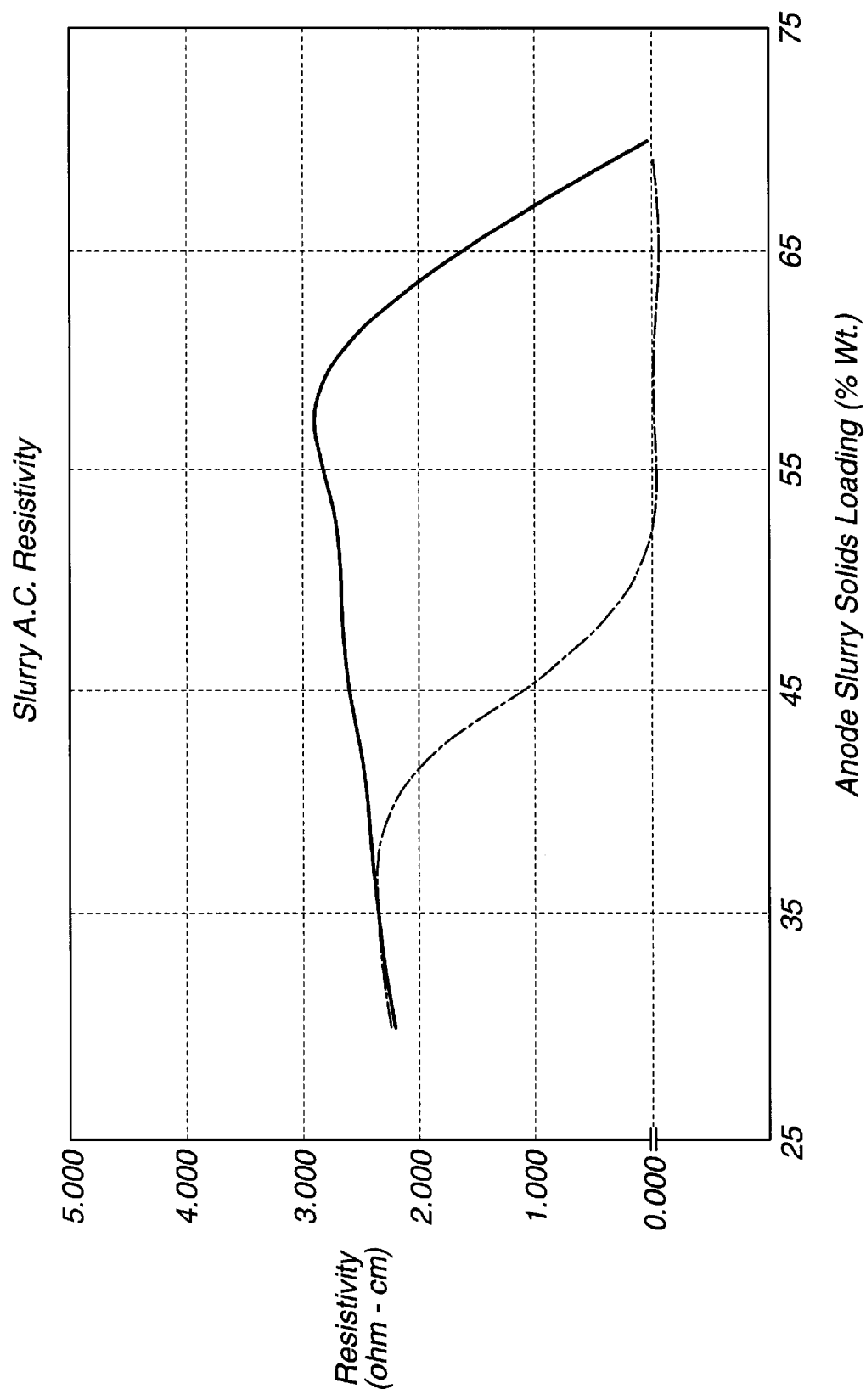
FIG. 5 shows the effect of anode solids loading on anode resistivity using different zinc particle size distributions.

One plausible theory for the mechanism that results in the good performance characteristics of batteries with anodes having high proportions of zinc dust or fines concerns particle-to-particle connectivity. This theory is only offered as a possible explanation of the observed results, and is not intended to limit the scope of the invention. In effect, it is believed that the additional fines form a mechanical network, particularly under electrical load and at low zinc loadings. This theory is supported by slurry resistivity measurements taken at various zinc loadings, as plotted in FIG. 5. In this figure, the solid line is of an anode mixture with zinc particles of −20/+200 mesh size and the dashed line is of an anode mixture with zinc particles of −200 mesh size. It is believed that improved connectivity between large particles, fines and dust results in higher conductivity at loadings down to 50% or less. As a result, more electrolyte may be added to the mixture to increase zinc utilization (i.e., increase zinc volumetric usage efficiency) while maintaining low anode resistance. This improvement in connectivity, if the above theory is correct, would also tend to account for the high slurry viscosity, as well as good tolerance for mechanical shock (e.g., tap load voltage stability and drop voltage stability, as described below) of anodes with high proportions of fines and dust.

Continuous 3.9 Ohm Load Test

This test simulates constant discharge in medium current draw applications, such as in some toys. A 3.9 ohm load is applied across the battery terminals and the battery is continuously discharged through the load. The amount of time from the application of the load to when the battery voltage drops to a cut-off voltage is recorded.

One Watt Continuous Load Test

In this test power is discharged from the battery at a constant rate of one watt, with the load automatically adjusted to account for changing battery voltage. This test is generally considered to be a more strenuous test than the 3.9 ohm continuous test, especially toward the end of the test as the battery voltage nears the cutoff value. The amount of time from the application of the load to when the battery voltage drops to a cut-off voltage is recorded.

Pulse Impedance Test

This test is a measure of the maximum dip in voltage that occurs when a fixed load is rapidly applied to the cell, and is an indication of the lag between voltage and current that can be exacerbated by the use of organic corrosion inhibitors to reduce gassing. Though of short duration, instantaneous drops in voltage can have significant consequences, as in devices which monitor instantaneous battery voltage and signal that the battery should be replaced if a low voltage is measured. A 3.9 ohm load is applied to the cell through a fast-acting relay, and the cell voltage is monitored on an oscilloscope. The load is maintained for 400 milliseconds. The minimum voltage during the test, which occurs upon application of the load, is measured.

High Current Pulse Test

This test was designed to simulate the performance of a battery in a camera application. A controlled 1.1 amp current is intermittently drawn from the battery in a series of pulses, each of 10 seconds duration with a 50 second pause in between each pulse. The pulse series is continued for one hour each day until the battery voltage drops to a predetermined cut-off level, at which point the total number of pulses is recorded. This test is also performed on cells that have been stored for two weeks at 55° C. to determine how storage at elevated temperatures affects high discharge rate performance.

Anode AC Bulk Resistivity

This test measures how well the anode performs as an electrical conductor. A small alternating current, oscillating at about 1000 Hz, is applied to a volume of prepared anode mixture (with proper proportions of zinc particles, gelling agent, electrolyte and additives for use in an electrochemical cell), and the bulk resistivity of the mixture is measured.

Tap Load Voltage Instability

This test is a measure of the mechanical stability of the anode during a physical bump or shock. It is common for the voltage of batteries to dip under load during a bump (such as when they are tapped against a hard surface). This test measures the magnitude of such undesirable voltage dips. A constant 3.9 ohm load is applied to the battery, and the battery is struck once with an automated hammer (with a force of about 50–60 pounds, inducing an effective peak acceleration of about 20–50 kilometers/second/second with high attenuation) once every 60 seconds, while monitoring the battery voltage. Generally, when the battery reaches about a 25 percent discharge, the magnitude of the voltage dips reaches a maximum value, decreasing as the battery continues to discharge. The severity of the maximum voltage drop is used as a measure of cell performance.

Particle Diameter Measurement

The data in FIG. 2 were generated by analyzing dry zinc alloy particles, in bulk. A representative amount of sample powder to be analyzed was transferred into the funnel of a RODOS-VIBRI™ Sample Dispersion unit, available from Sympatec, which dispersed the powder into a stream of air to form an aerosol. The aerosol of the zinc powder is then passed through a HELOS™ Particle Size Analyzer, also available from Sympatec, which measures the intensity and distribution of light diffused through the aerosol of spinning particles. Various optical lenses with different focal lengths are used, in accordance with manufacturer's recommendations, with particles of different size ranges.

The above-described test provides an indication of the bulk distribution of particle size over a range, with the particle size classified by an effective diameter somewhere between the maximum and minimum linear particle dimensions. This measurement cannot, therefore, be directly correlated to a particle mesh size.

EXAMPLE 1

Cylindrical alkaline batteries of Type AA were built with gel anodes having the following two compositions to test the effect of zinc fines (the composition values listed are in percent by weight):

| Composition | 1A | 1B |
|---|---|---|
| Zinc alloy particles | 67.97 | 67.97 |
| Indium acetate (42% Indium) | 0.03 | 0.03 |
| Phosphate ester (6% concentration) | 0.06 | 0.06 |
| Polyacrylic acid | 0.53 | 0.53 |
| Sodium Polyacrylate | 0.38 | 0.38 |
| Acetic acid (2.5% concentration) | 0.09 | 0.09 |
| Electrolyte solution (2% ZnO, 35% KOH) | 30.94 | 30.94 |
| Total: | 100.00 | 100.00 |
| Zinc particle sieve size | −20/+200 | −200 |

The above compositions were prepared by first mixing the indium acetate powder with the dry zinc alloy particles. Next, the acetic acid and phosphate ester were applied, followed by the polyacrylic acid and sodium polyacrylate. After blending and crushing any lumps, the electrolyte solution was added and the mixture was blended until uniform.

In each of the following tests, four individual batteries were tested.

Figure 6A:
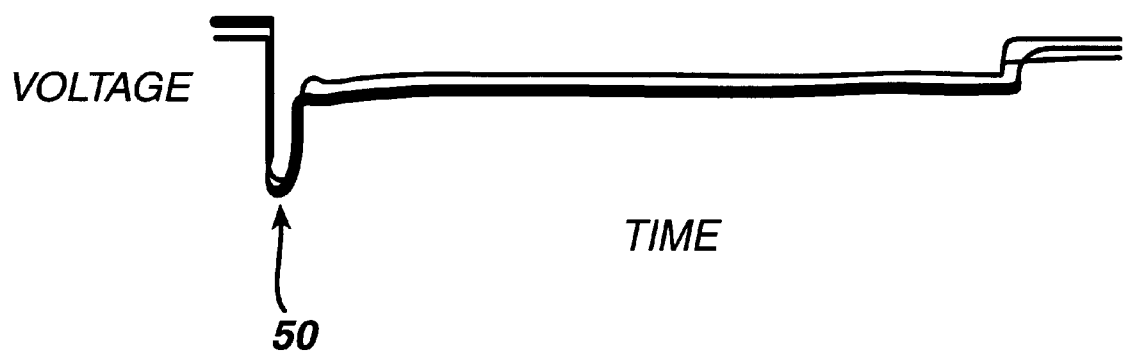
FIGS. 6A and 6B show battery voltage traces taken during pulse impedance tests of the cells of Example 1.
Figure 6B:
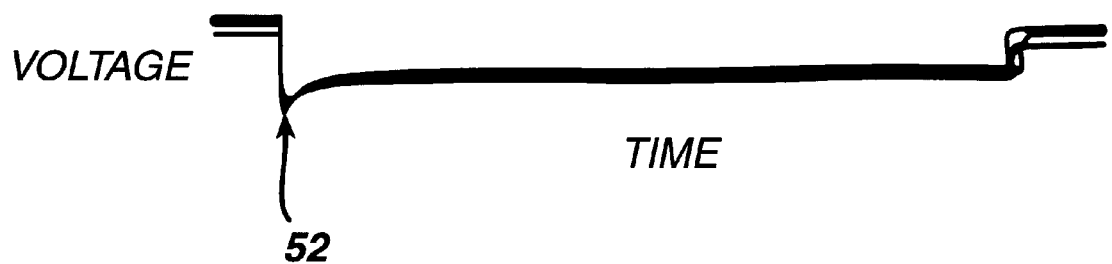

| Example 1 test results: | 1A | 1B |
|---|---|---|
| Continuous 3.9 ohm load test | | |
| Hours to 1.0 volts | 1.51 | 1.57 |
| Hours to 0.9 volts | 1.70 | 1.86 |
| Hours to 0.8 volts | 1.73 | 2.01 |
| One watt Continuous load test | | |
| Hours to 1.0 volts | 0.58 | 0.51 |
| Hours to 0.9 volts | 0.74 | 0.66 |
| Hours to 0.8 volts | 0.84 | 0.77 |
| High Current pulse test | | |
| Pulses to 1.0 volts | 174 | 221 |
| Pulses to 0.9 volts | 233 | 337 |
| Pulses to 0.8 volts | 306 | 421 |
| Pulse impedance test | | |
| Actual voltage trace | FIG. 6A | FIG. 6B |

Note that in the pulse impedance tests the peak voltage dip 50 of build 1A (FIG. 6A) is much more pronounced than the voltage dip 52 of build 1B (FIG. 6B).

EXAMPLE 2

Cylindrical alkaline batteries of Type AA were built with gel anodes having the following two compositions (the composition values listed are in percent by weight):

| Composition | 2A | 2B | 2C |
|---|---|---|---|
| Zinc alloy particles | 69.80[1] | 69.80[2] | 69.80[3] |
| Indium acetate (42% Indium) | 0.04 | 0.04 | 0.04 |
| Phosphate ester (6% concentration) | 0.06 | 0.06 | 0.06 |
| Polyacrylic acid (Carbopol 940) | 0.51 | 0.45 | 0.45 |
| Acetic acid (2.5% concentration) | 1.12 | 1.12 | 1.12 |
| Electrolyte solution (2% ZnO, 35% KOH) | 28.47 | 28.53 | 28.53 |
| Total: | 100.00 | 100.00 | 100.00 |

[1]Alloy includes 150 ppm In, 200 ppm Bi; particles sieved to −20/+200 mesh size (mean effective particle diameter of 317 micron; distribution 36, FIG. 2)
[2]Alloy includes 150 ppm In, 200 ppm Bi; particles sieved to −325 mesh size (mean effective particle diameter of 57 micron; distribution 32, FIG. 2).
[3]An equal mixture, by weight, of particles as in build 2A and gas atomized zinc particles alloyed with 500 ppm In and 500 ppm Bi. The gas atomized particles had a mean effective particle diameter of about 41 micron (distribution 34, FIG. 2). The particle mixture corresponds to distribution 40.

[1]Alloy includes 150 ppm In, 200 ppm Bi; particles sieved to −20/+200 mesh size (mean effective particle diameter of 317 micron; distribution 36, FIG. 2)
[2]Alloy includes 150 ppm In, 200 ppm Bi; particles sieved to −325 mesh size (mean effective particle diameter of 57 micron; distribution 32, FIG. 2).
[3]An equal mixture, by weight, of particles as in build 2A and gas atomized zinc particles alloyed with 500 ppm In and 500 ppm Bi. The gas atomized particles had a mean effective particle diameter of about 41 micron (distribution 34, FIG. 2). The particle mixture corresponds to distribution 40.

For each of the following tests, at least four individual batteries of each composition were tested. The results of the individual batteries are averaged.

| Example 2 test results: | 2A | 2B | 2C |
|---|---|---|---|
| High current pulse test to 1.0 V | | | |
| Pulses as built | 226 | 293 | 299 |
| Pulses after storage | 217 | 278 | 244 |
| Tap load voltage instability | | | |
| (max voltage drop, mV) | 374 | 112 | 71 |

Very small zinc particles, such as zinc fines and dust, tend to be more unstable in oxygen-rich environments than larger particles and must therefore be processed with due care. Such issues, together with physical bulk handling issues of powders and fines, may need to be considered when determining the absolute minimum practical particle size for production anodes.

Other embodiments are also within the scope of the following claims.

What is claimed is:

1. A negative electrode for an electrochemical cell, comprising zinc alloy particles, the particles being suspended in a fluid medium, at least about 10 percent, by weight, of the active particles being of −200 mesh size or smaller.

2. The negative electrode of claim 1, wherein at least about 25 percent, by weight, of the particles are of −200 mesh size or smaller.

3. The negative electrode of claim 2, wherein at least about 50 percent, by weight, of the particles are of −200 mesh size or smaller.

4. The negative electrode of claim 3, wherein at least about 80 percent, by weight, of the particles are of −200 mesh size or smaller.

5. The negative electrode of claim 1, wherein at least about 10 percent, by weight, of the particles are of −325 mesh size or smaller.

6. The negative electrode of claim 5, wherein at least about 45 percent, by weight, of the particles are of −325 mesh size or smaller.

7. The negative electrode of claim 6, wherein at least about 80 percent, by weight, of the particles are of −325 mesh size or smaller.

8. The negative electrode of claim 1 further including a surfactant.

9. The negative electrode of claim 1 wherein the fluid medium comprises an electrolyte and a thickening agent.

10. The negative electrode of claim 9 wherein the particles include a plating material selected from the group consisting of indium and bismuth.

11. The negative electrode of claim 1 wherein at least about 25 percent, by weight, of the particles are between about 20 and 200 mesh size.

12. The negative electrode of claim 11 wherein at least about 50 percent, by weight, of the particles are between about 20 and 200 mesh size.

13. The negative electrode of claim 1 wherein the particles are generally acicular, having a length along a major axis at least two times a length along a minor axis.

14. The negative electrode of claim 1 wherein the particles are generally flakes, each flake generally having a thickness of no more than about 20 percent of the maximum linear dimension of the particle.

15. A negative electrode mixture for an electrochemical cell, comprising zinc alloy particles, the particles being suspended in a fluid medium with the active particles comprising less than about 55 percent of the electrode mixture, by weight; the particles including a sufficient proportion of particles of about −200 mesh size or smaller to provide an electrode resistivity of less than about 0.2 ohm-centimeters.

16. The negative electrode mixture of claim 15 wherein the particles comprise less than about 45 percent, by weight, of the electrode mixture.

17. The negative electrode mixture of claim 15, wherein at least about 10 percent, by weight, of the particles are of −200 mesh size or smaller.

18. The negative electrode mixture of claim 17, wherein at least about 10 percent, by weight, of the particles are of −325 mesh size or smaller.

19. The negative electrode mixture of claim 15 wherein at least about 25 percent, by weight, of the particles are between about 20 and 200 mesh size.

20. A primary electrochemical cell having
   a cathode,
   an anode comprising zinc alloy particles, the particles being suspended in a fluid medium, at least 10 percent, by weight, of the particles being of −200 mesh size or smaller, and
   a separator between the cathode and the anode.

21. The primary electrochemical cell of claim 20, wherein at least about 25 percent, by weight, of the particles are of −200 mesh size or smaller.

22. The primary electrochemical cell of claim 21, wherein at least about 50 percent, by weight, of the particles are of −200 mesh size or smaller.

23. The primary electrochemical cell of claim 22, wherein at least about 80 percent, by weight, of the particles are of −200 mesh size or smaller.

24. The primary electrochemical cell of claim 20, wherein at least about 10 percent, by weight, of the particles are of −325 mesh size or smaller.

25. The primary electrochemical cell of claim 24, wherein at least about 45 percent, by weight, of the particles are of −325 mesh size or smaller.

26. The primary electrochemical cell of claim 25, wherein at least about 80 percent, by weight, of the particls are of −325 mesh size or smaller.

27. A method of generating an electric current, comprising accumulating ions on the surface of zinc alloy particles suspended in a fluid medium containing an electrolyte, at least about 10 percent, by weight, of the particles being of −200 mesh size or smaller.

* * * * *

UNITED STATES PATENT AND TRADEMARK OFFICE
CERTIFICATE OF CORRECTION

PATENT NO.    : 6,284,410 B1
DATED         : September 4, 2001
INVENTOR(S)   : Richard E. Durkot, Lifun Lin and Peter B. Harris It is certified that error appears in the above-identified patent and that said Letters Patent is hereby corrected as shown below:

<u>Title page,</u>
Item [56], References Cited, please add the following references:
-- U.S. PATENT DOCUMENTS

| | | |
|---|---|---|
| 5,780,186 | 07/1998 | Casey, Jr |
| 5,750,288 | 05/1998 | Xie et al. |
| 5,741,609 | 04/1998 | Chen et al. |
| 5,712,060 | 01/1998 | Grigorieva et al. |
| 5,652,043 | 07/1997 | Nitzan |
| 5,626,988 | 05/1997 | Daniel-Ivad et al. |
| 5,587,254 | 12/1996 | Kojima et al. |
| 5,541,021 | 07/1996 | Watanabe et al. |
| 5,532,087 | 07/1996 | Nerz et al. |
| 5,514,496 | 05/1996 | Mishima et al. |
| 5,482,798 | 01/1996 | Mototani et al. |
| 5,445,908 | 08/1995 | Inoue et al. |
| 5,434,023 | 07/1995 | Teraoka et al. |
| 5,432,031 | 07/1995 | Teraoka et al. |
| 5,425,798 | 06/1995 | Sasaki et al. |
| 5,424,145 | 06/1995 | Tomantschger et al. |
| 5,419,987 | 05/1995 | Goldstein et al. |
| 5,389,468 | 02/1995 | Fujiwara et al. |
| 5,376,480 | 12/1994 | Shinoda et al. |
| 5,368,958 | 11/1994 | Hirai et al. |
| 5,348,816 | 09/1994 | Shinoda et al. |
| 5,346,781 | 09/1994 | Yuasa et al. |
| 5,340,666 | 08/1994 | Tomantschger et al. |
| 5,312,476 | 05/1994 | Uemura et al. |
| 5,296,267 | 03/1994 | Tada et al. |
| 5,283,139 | 02/1994 | Newman et al. |
| 5,278,005 | 01/1994 | Yamauchi et al. |
| 5,240,793 | 08/1993 | Glaeser |
| 5,232,798 | 08/1993 | Goldstein et al. |
| 5,228,958 | 07/1993 | Goldstein et al. |
| 5,209,995 | 05/1993 | Tada et al. |
| 5,206,096 | 03/1993 | Goldstein et al. |
| 5,198,315 | 03/1993 | Tada et al. |
| 5,164,274 | 11/1992 | Kordesch et al. |

UNITED STATES PATENT AND TRADEMARK OFFICE
CERTIFICATE OF CORRECTION

PATENT NO. : 6,284,410 B1
DATED : September 4, 2001
INVENTOR(S) : Richard E. Durkot, Lifun Lin and Peter B. Harris It is certified that error appears in the above-identified patent and that said Letters Patent is hereby corrected as shown below:

U.S. PATENT DOCUMENTS, (cont'd)

| | | |
|---|---|---|
| 5,162,169 | 11/1992 | Tomantschger et al. |
| 5,147,739 | 09/1992 | Beard |
| 5,139,900 | 08/1992 | Tada et al. |
| 5,108,494 | 04/1992 | Uemura et al. |
| 4,996,129 | 02/1991 | Tuck |
| 4,994,333 | 02/1991 | Jose et al. |
| 4,957,827 | 09/1990 | Kordesch et al. |
| 4,861,688 | 08/1989 | Miura et al. |
| 4,812,374 | 03/1989 | Kagawa et al. |
| 4,743,185 | 05/1988 | Vu et al. |
| 4,735,876 | 04/1988 | Miura et al. |
| 4,722,763 | 02/1988 | Pa et al. |
| 4,681,698 | 07/1987 | Graham et al. |
| 4,649,093 | 03/1987 | Vu et al. |
| 4,632,699 | 12/1986 | Meeus et al. |
| 4,604,335 | 08/1986 | Johnson |
| 4,592,974 | 06/1986 | Takeda et al. |
| 4,585,716 | 04/1986 | Chalilpoyil et al. |
| 4,579,791 | 04/1986 | Wang |
| 4,563,404 | 01/1986 | Bahary |
| 4,514,473 | 04/1985 | Atkin et al. |
| 4,500,614 | 02/1985 | Nagamine et al. |
| 4,464,446 | 08/0/84 | Berger et al. |
| 4,460,543 | 07/1984 | Glaeser |
| 4,455,358 | 06/1984 | Graham et al. |
| 4,435,488 | 03/1984 | Bahary et al. |
| 4,427,751 | 01/1984 | Furukawa et al. |
| 4,404,117 | 09/1983 | Gugenberger |
| 4,380,578 | 04/1983 | Bahary |
| 4,361,633 | 11/1982 | Nel et al. |
| 4,332,870 | 06/1982 | Parsen et al. |
| 4,328,297 | 05/1982 | Bilhorn |
| 4,288,913 | 09/1981 | Parsen et al. |
| 4,260,669 | 04/1981 | Kerg |
| 4,247,606 | 01/1981 | Uetani et al. |
| 4,242,424 | 12/1980 | Buckler et al. |
| 4,209,577 | 06/1980 | Clash |
| 4,197,635 | 04/1980 | Bilhorn |
| 4,195,120 | 03/1980 | Rossler et al. |
| 4,175,052 | 11/1979 | Norteman, Jr. |
| 4,144,382 | 03/1979 | Takeda et al. |

UNITED STATES PATENT AND TRADEMARK OFFICE
CERTIFICATE OF CORRECTION

PATENT NO.     : 6,284,410 B1
DATED          : September 4, 2001
INVENTOR(S)    : Richard E. Durkot, Lifun Lin and Peter B. Harris It is certified that error appears in the above-identified patent and that said Letters Patent is hereby corrected as shown below:

U.S. PATENT DOCUMENTS, (cont'd)
| | | |
|---|---|---|
| 4,112,205 | 09/ 1978 | Charkoudian et al. |
| 4,104,188 | 08/1978 | Nicaise |
| 3,953,242 | 04/1976 | Hoffinan |
| 3,884,722 | 05/1975 | Tucholski |
| 3,923,544 | 12/1975 | Berchielli |
| 3,784,506 | 01/1974 | Vasta |
| 3,661,645 | 05/1972 | Strier et al. |
| 552,709 | 01/1896 | Huber |

Item [56],FOREIGN PATENT DOCUMENTS, please add the following reference:
| | | | |
|---|---|---|---|
| -- | WO 98/20569 | 05/1998 | PCT |
| | 60-91562 | 05/1995 | Japan (Abstract) |
| | 7-105948 | 04/1995 | Japan (Abstract) |
| | 0 377 106 | 03/1995 | EPO |
| | 5-101824 | 04/1993 | Japan (Abstract) |
| | 3-272563 | 12/1991 | Japan (Abstract) |
| | 61-203564 | 00/1986 | Japan |
| | 0 162 411 | 11/1985 | EPO |
| | 0 161 701 | 11/1985 | EPO |
| | 59-167961 | 09/1984 | Japan (Abstract) |
| | 58-218760 | 12/1983 | Japan (Abstract) |
| | 58-158867 | 09/1983 | Japan (Abstract) |
| | 56-145669 | 11/1981 | Japan (Abstract) |
| | 55-117869 | 09/1980 | Japan |
| | 46445 | 04/1977 | Japan (Abstract) |
| | 47-43896 | 11/ /68 | Japan (Abstract) |

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.        : 6,284,410 B1                                    Page 1 of 1
APPLICATION NO.   : 08/905254
DATED             : September 4, 2001
INVENTOR(S)       : Richard E. Durkot, Lifun Lin and Peter B. Harris It is certified that error appears in the above-identified patent and that said Letters Patent is hereby corrected as shown below:

In col. 8, line 25, delete lines 25-31.

Signed and Sealed this

Third Day of April, 2007

JON W. DUDAS
*Director of the United States Patent and Trademark Office*

/

(12) EX PARTE REEXAMINATION CERTIFICATE (5444th)
United States Patent
Durkot et al.

(10) Number: US 6,284,410 C1
(45) Certificate Issued: Jul. 4, 2006

(54) ZINC ELECTRODE PARTICLE FORM

(75) Inventors: Richard Edward Durkot, East Walpole, MA (US); Lifun Lin, Lincoln, MA (US); Peter Bayard Harris, Stow, MA (US)

(73) Assignee: The Gillette Company, Boston, MA (US)

Reexamination Request:
No. 90/006,776, Sep. 16, 2003

Reexamination Certificate for:
Patent No.: 6,284,410
Issued: Sep. 4, 2001
Appl. No.: 08/905,254
Filed: Aug. 1, 1997

Certificate of Correction issued Feb. 25, 2003.

(51) Int. Cl.
*H01M 4/42* (2006.01)

(52) U.S. Cl. .................... 429/229; 429/134; 429/300
(58) Field of Classification Search ............... 429/224, 429/229, 134, 300
See application file for complete search history.

(56) References Cited

U.S. PATENT DOCUMENTS

| 5,342,712 A | 8/1994 | Mieczkowska et al. | |
| 5,401,590 A | * 3/1995 | Chalilpoyil et al. | 429/59 |
| 5,419,987 A | 5/1995 | Goldstein et al. | |

OTHER PUBLICATIONS

Glaeser, W., "Gas Evolution Data On Very–Low–Mercury-Content Zinc Powders For Alkaline Batteries", Chapter 18 in *Power Sources 12: Reasearch And Development In Non-Mechanical Electrical Power Sources, Proceedings Of The 16th International Power Sources Symposium Held At Bournemouth, Sep., 1988,* (T. Kelly and B.W. Baxter eds.) (1989).

Strauven, Y. and M. Meeus, "Quality Requirements For Zinc Powders In Green Alkaline Batteries", *Program Of Technical Conference In China International Battery Fair(CIBF) '95*, Abstract, pp. 80–83 (Beijing, 1995).

Strauven, Y. and M. Meeus, "Quality Requirements For Zinc Powders In Green Alkaline Batteries", *Papers Of Technical Conference In China International Battery Fair(CIBF) '95*, pp. 33–43 (Beijing, 1995).

* cited by examiner

*Primary Examiner*—Bruce F. Bell

(57) ABSTRACT

A primary electrochemical cell with an anode comprising zinc alloy particles suspended in a fluid medium is disclosed. The zinc alloy particles include at least about 10 percent, by weight, of fines (particles of −200 mesh size) or dust (particles of −325 mesh size). The zinc particles are preferably alloyed with indium or bismuth and of acicular or flake form. The anode has a low resistivity at low zinc loadings, and the cell demonstrates good mechanical stability and overall performance.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15–19 is confirmed.

Claim 27 is cancelled.

Claims 1 and 20 are determined to be patentable as amended.

Claims 2–14 and 21–26, dependent on an amended claim, are determined to be patentable.

New claims 28–45 are added and determined to be patentable.

1. A negative electrode for an electrochemical cell, comprising zinc alloy particles, the particles being suspended in a fluid medium, at least about 10 percent, by weight, of the active particles being of −200 mesh size or smaller, *wherein the zinc alloy consists of zinc alloyed with bismuth, indium, or a combination thereof.*

20. A primary electrochemical cell having
   a cathode,
   an anode comprising zinc alloy particles, the particles being suspended in a fluid medium, at least 10 percent, by weight, of the particles being of −200 mesh size or smaller, *wherein the zinc alloy consists of zinc alloyed with bismuth, indium, or a combination thereof,* and
   a separator between the cathode and the anode.

28. *A negative electrode for an electrochemical cell, comprising zinc alloy particles, the particles being suspended in a fluid medium, at least about 50 percent, by weight, of the active particles being of −200 mesh size or smaller.*

29. *A primary electrochemical cell having*
   *a cathode,*
   *an anode comprising zinc alloy particles, the particles being suspended in a fluid medium, at least about 50 percent, by weight, of the particles being of −200 mesh size or smaller, and*
   *a separator between the cathode and the anode.*

30. *A negative electrode for an electrochemical cell, comprising zinc alloy particles, the particles being suspended in a fluid medium, at least about 10 percent, by weight, of the active particles being of −200 mesh size or smaller, wherein the zinc alloy consists of zinc alloyed with bismuth, indium, or a combination thereof, and an organic gassing inhibitor.*

31. *The negative electrode of claim 30, wherein the organic gassing inhibitor comprises a surfactant.*

32. *The negative electrode of claim 30, wherein the organic gassing inhibitor comprises a phosphate ester.*

33. *A primary electrochemical cell having*
   *a cathode,*
   *an anode comprising zinc alloy particles, the particles being suspended in a fluid medium, at least 10 percent, by weight, of the particles being of −200 mesh size or smaller, and an organic gassing inhibitor, wherein the zinc alloy consists of zinc alloyed with bismuth, indium, or a combination thereof, and*
   *a separator between the cathode and the anode.*

34. *The primary electrochemical cell of claim 33, wherein the organic gassing inhibitor comprises a surfactant.*

35. *The primary electrochemical cell of claim 33, wherein the organic gassing inhibitor comprises a phosphate ester.*

36. *The negative electrode of claim 1, wherein the zinc alloy consists of zinc alloyed with bismuth and indium.*

37. *The negative electrode of claim 28, wherein the zinc alloy consists of zinc alloyed with bismuth, indium, or a combination thereof.*

38. *The negative electrode of claim 30 or 37, wherein the zinc alloy consists of zinc alloyed with bismuth and indium.*

39. *The negative electrode of claim 38, wherein the anode comprises a phosphate ester.*

40. *The primary electrochemical cell of claim 20, wherein the zinc alloy consists of zinc alloyed with bismuth and indium.*

41. *The primary electrochemical cell of claim 29, wherein the zinc alloy consists of zinc alloyed with bismuth, indium, or a combination thereof.*

42. *The primary electrochemical cell of claim 33 or 41, wherein the zinc alloy consists of zinc alloyed with bismuth and indium.*

43. *The primary electrochemical cell of claim 42, wherein the anode comprises a phosphate ester.*

44. *The primary electrochemical cell of claim 20, 29, or 33, wherein the cathode comprises manganese dioxide.*

45. *The primary electrochemical cell of claims 20, 29, or 33, wherein the cathode comprises an alkaline electrolyte.*

* * * * *